UNITED STATES PATENT OFFICE.

ANDREW J. ROWLAND, OF CINCINNATI, OHIO, ASSIGNOR TO THE FEDERAL PRODUCTS COMPANY, OF CINCINNATI, OHIO, A CORPORATION OF OHIO.

COATING AND IMPREGNATING AGENT AND THE PROCESS OF MAKING IT.

1,393,832. Specification of Letters Patent. Patented Oct. 18, 1921.

No Drawing. Application filed October 6, 1920. Serial No. 415,124.

*To all whom it may concern:*

Be it known that I, ANDREW J. ROWLAND, a citizen of the United States, residing at Cincinnati, in the county of Hamilton and State of Ohio, have invented a certain new and useful Coating and Impregnating Agent and the Process of Making It, of which the following is a specification.

My invention relates to a novel composition of matter for a coating and impregnating agent for fiber and other containers and surfaces, and to the process of making said agent.

The object of my invention is to provide a water-proof coating or impregnating agent for containers or other surfaces that will be economical to manufacture, of light color, free from objectionable odors, possessing a fair degree of pliability, and that will not impart any poisonous ingredients to any edible product with which it comes in contact.

My invention consists in the composition of matter and in the process of making the compound as herein set forth and claimed.

The composition consists of the following ingredients combined preferably in substantially the following proportions:

Aluminum oleate $Al(C_{17}H_{33}—COO)3$ about 90%.

India rubber or its equivalent, crude rubber or rubber in any other form, or gutta percha, about 10%. The percentage of aluminum oleate to the rubber will depend upon the pliability desired in the finished product as, for instance, where the product is to be used as an impregnating agent, it will be desirable to have it more pliable than otherwise.

Where it is only desired to moisture-proof the container, such for instance, as a container for salts or other solid matter which may absorb moisture, a very low percentage of rubber can be used, but for a container to hold liquids of any kind it would be necessary to add a larger per cent. of rubber in order to give the coating a certain degree of pliability and elasticity to stand the ordinary usage and handling without cracking the coating.

The proportions of the ingredients may vary as follows:

Aluminum oleate from 80% to 99% and india rubber, or its equivalent, from 1% to 20%, as for instance, when 10% of india rubber is used, 90% of aluminum oleate will be used, and will give very satisfactory results. Greater pliability is obtained by the addition of more rubber.

My invention further consists in combining a major proportion of aluminum oleate with a minor proportion of india rubber, or its equivalent.

The process consists in melting a major proportion of aluminum oleate to about 300° F. and then adding a lesser proportion of india rubber, or its equivalent, maintaining the temperature at about 300° F. for three hours or until the rubber is dissolved in the aluminum oleate, then heating the compound to about 320° F. and blowing steam therethrough for about two hours for the purpose of deodorizing the same. This deodorizing is preferably performed under a vacuum of about twenty to twenty-five inches, but it may, if desired, be steam-blown at atmospheric pressure. Also, the addition of a larger quantity of india rubber results in a very pronounced deodorizing effect without the above mentioned heating and steam-blowing.

The compound is then allowed to cool to a temperature of about 200° F. when it is dissolved, preferably, by the addition of 80% to 97% of benzol or other suitable solvent, such as gasolene, alcohol and naphtha. After introducing the solvent and allowing the composition to cool, it is then ready for use and may be applied to the container or other surface by brush, spraying, dipping or any other method desired. A paper, pulp or fiber container coated or impregnated with said agent forms a very satisfactory receptacle for milk, milk products, cheese, ice cream, syrups, powders, dry food-stuffs and the like.

My invention is capable of some modification without departure from its scope or spirit, as, for instance, while I have specified the use of aluminum oleate as one of the ingredients, copper oleate may, if desired, be used with fairly good results, and any other known metallic oleate, except sodium oleate and potassium oleate, may likewise be used; also where rubber is specified in the claims I desire it to be understood as including any equivalent thereof.

Having described my invention, what I claim as new and desire to secure by Letters Patent is:

1. A coating and impregnating agent consisting of a metallic oleate and rubber, substantially as and for the purpose specified.

2. A coating and impregnating agent consisting of aluminum oleate and india rubber, substantially as described and for the purpose specified.

3. A coating and impregnating agent for a coating or impregnating agent, consisting of about 90% of aluminum oleate and about 10% of india rubber.

4. A coating and impregnating agent for a coating or impregnating agent consisting of from about 80% to 99% of aluminum oleate and from about 1% to 20% of india rubber.

5. A coating and impregnating agent consisting of a major portion of a metallic oleate and a lesser proportion of india rubber.

6. A coating and impregnating agent consisting of a major portion of aluminum oleate and a lesser proportion of India rubber.

7. The herein described process which consists in first heating metallic oleate to a high degree of temperature, then maintaining said temperature while dissolving therein a quantity of India rubber, then heating said compound to a higher degree of temperature, then blowing steam therethrough at said higher degree of temperature, then reducing the temperature, and then dissolving said compound by the addition of a solvent, substantially as herein described.

8. The herein described process which consists in heating aluminum oleate to a high degree of temperature, then dissolving therein a quantity of india rubber, then heating said compound to a higher degree of temperature, then blowing steam therethrough, then reducing the temperature to about 200° F., and then dissolving said compound by the addition of a solvent, substantially as herein described.

9. The herein described process which consists in heating aluminum oleate to about 300° F., then adding a lesser proportion of india rubber, maintaining the temperature at about 300° F. until the rubber is dissolved in the aluminum oleate, then heating the compound to about 320° F., and blowing steam therethrough for about two hours, then reducing the temperature to about 200° F. and then adding a solvent.

10. The herein described process which consists in heating aluminum oleate to about 300° F., then dissolving therein a quantity of india rubber, then blowing steam through the heated compound, then reducing the temperature and adding a solvent, substantially as herein described.

11. The herein described process which consists in heating aluminum oleate to a high degree of temperature, then dissolving therein a quantity of india rubber, then heating said compound to a higher degree of temperature, then blowing steam therethrough, then reducing the compound to a lower degree of temperature, and then dissolving said compound by the addition of benzol, substantially as herein described.

12. The herein described process which consists in heating aluminum oleate to about 300° F., then maintaining said temperature while dissolving therein a quantity of india rubber, then heating said compound to a higher degree of temperature, then blowing steam therethrough at said higher degree of temperature, then reducing the temperature to about 200° F., and then dissolving said compound by the addition of from 80% to 97% of solvent, substantially as herein described.

13. The herein described process which consists in heating aluminum oleate to a high degree of temperature, then blowing steam therethrough, then maintaining said temperature while dissolving therein a quantity of india rubber, then reducing said temperature, and then dissolving said compound by the addition of a solvent, substantially as herein described.

14. The herein described process which consists in heating metallic oleate to a high degree of temperature, then maintaining said temperature while dissolving therein a quantity of india rubber, then heating said compound to a higher degree of temperature, then blowing steam therethrough at said higher temperature within a vacuum, then reducing the temperature, and then dissolving said compound by the addition of a solvent, substantially as herein described.

15. The herein described process which consists in heating metallic oleate to a high degree of temperature, then maintaining said temperature while dissolving therein a quantity of india rubber, then heating said compound to a higher degree of temperature, then blowing steam therethrough at said higher degree of temperature within a vacuum of about twenty to twenty-five inches, then reducing the temperature, and then dissolving said compound by the addition of a solvent, substantially as herein described.

ANDREW J. ROWLAND.

Witnesses:
JAMES N. RAMSEY,
IRENE OGDEN.